(12) United States Patent
Greco et al.

(10) Patent No.: US 10,108,558 B2
(45) Date of Patent: Oct. 23, 2018

(54) KEY ENCRYPTION AND DECRYPTION

(71) Applicant: International Business Machines Corporation, Armonk, NY (US)

(72) Inventors: Paul M. Greco, Tucson, AZ (US); Glen A. Jaquette, Tucson, AZ (US); Scott J. Schaffer, Tucson, AZ (US)

(73) Assignee: INTRENATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/617,800

(22) Filed: Jun. 8, 2017

(65) Prior Publication Data

US 2017/0270057 A1 Sep. 21, 2017

Related U.S. Application Data

(60) Continuation of application No. 14/627,763, filed on Feb. 20, 2015, which is a division of application No.
(Continued)

(51) Int. Cl.
*G06F 12/14* (2006.01)
*G06F 21/60* (2013.01)
(Continued)

(52) U.S. Cl.
CPC ........ *G06F 12/1408* (2013.01); *G06F 21/602* (2013.01); *G06F 21/72* (2013.01);
(Continued)

(58) Field of Classification Search
CPC ......... G06F 12/1408; G06F 2212/1052; G06F 2212/402; G06F 21/72; G06F 21/602;
(Continued)

(56) References Cited

U.S. PATENT DOCUMENTS 4,430,584 A 2/1984 Someshwar et al.
4,719,458 A 1/1988 Miesterfeld et al.
(Continued)

FOREIGN PATENT DOCUMENTS

JP 3824297 7/2006

OTHER PUBLICATIONS

"Information Distribution Via ROM Disks", IBM Corporation, Technical Disclosure Bulletin, vol. 33, No. 12, May 1991, pp. 70-71.

(Continued)

*Primary Examiner* — Jeffrey D Popham
(74) *Attorney, Agent, or Firm* — Janaki K. Davda; Konrad Raynes Davda & Victor LLP

(57) ABSTRACT

Provided is a data storage drive for encrypting data, comprising a microprocessor and circuitry coupled to the microprocessor and adapted to receive a session encrypted data key and to decrypt the session encrypted data key using a session key, wherein a result is a data key that is capable of being used to encrypt clear text and to decrypt cipher text written to a storage medium. Also provided is a system, comprising a microprocessor and circuitry coupled to the microprocessor and adapted to receive a session encrypted data key and to decrypt the session encrypted data key using a private key, wherein a result is a secret key that is capable of being used to encrypt clear text and to decrypt cipher text written to a storage medium.

9 Claims, 3 Drawing Sheets

Related U.S. Application Data

11/733,669, filed on Apr. 10, 2007, now Pat. No. 9,008,317.

(51) Int. Cl.

| | |
|---|---|
| *G06F 21/72* | (2013.01) |
| *G09C 1/00* | (2006.01) |
| *H04L 9/08* | (2006.01) |
| *H04L 9/14* | (2006.01) |
| *H04L 9/32* | (2006.01) |
| *H04L 9/30* | (2006.01) |
| *H04L 29/06* | (2006.01) |
| *H04L 9/06* | (2006.01) |

(52) U.S. Cl.
CPC .............. *G09C 1/00* (2013.01); *H04L 9/0618* (2013.01); *H04L 9/083* (2013.01); *H04L 9/14* (2013.01); *H04L 9/30* (2013.01); *H04L 9/3247* (2013.01); *H04L 63/061* (2013.01); *H04L 63/0823* (2013.01); *G06F 2212/1052* (2013.01); *G06F 2212/402* (2013.01); *H04L 2209/12* (2013.01)

(58) Field of Classification Search
CPC ....... H04L 9/30; H04L 63/061; H04L 9/3247; H04L 63/0823; H04L 9/0618; H04L 9/14; H04L 9/083; H04L 2209/12; G09C 1/00
USPC ....................................................... 713/156
See application file for complete search history.

(56) References Cited

U.S. PATENT DOCUMENTS

| | | | |
|---|---|---|---|
| 5,109,493 | A | 4/1992 | Banerjee |
| 5,235,641 | A | 8/1993 | Nozawa et al. |
| 5,687,237 | A * | 11/1997 | Naclerio ............... H04L 9/0894 380/277 |
| 6,069,857 | A | 5/2000 | Schell et al. |
| 6,069,957 | A | 5/2000 | Richards |
| 6,134,660 | A | 10/2000 | Boneh et al. |
| 6,636,966 | B1 | 10/2003 | Lee et al. |
| 6,690,795 | B1 | 2/2004 | Richards |
| 9,008,317 | B2 | 4/2015 | Greco et al. |
| 2002/0023032 | A1 | 2/2002 | Pearson et al. |
| 2002/0188856 | A1 * | 12/2002 | Worby .................... G06F 21/80 713/193 |
| 2003/0074319 | A1 | 4/2003 | Jaquelle |
| 2004/0078584 | A1 | 4/2004 | Moroney et al. |
| 2004/0123112 | A1 | 6/2004 | Himmel et al. |
| 2004/0228493 | A1 * | 11/2004 | Ma .......................... G06F 21/64 380/286 |
| 2005/0005092 | A1 | 1/2005 | Jeong et al. |
| 2005/0091491 | A1 * | 4/2005 | Lee ......................... G06F 21/10 713/167 |
| 2005/0152670 | A1 | 7/2005 | Skaar |
| 2005/0216750 | A1 | 9/2005 | Bricher et al. |
| 2005/0220305 | A1 | 10/2005 | Fujimoto et al. |
| 2006/0059368 | A1 | 3/2006 | Fayad et al. |
| 2006/0059369 | A1 | 3/2006 | Fayad et al. |
| 2006/0059373 | A1 | 3/2006 | Fayad et al. |
| 2006/0236129 | A1 | 10/2006 | Mimatsu |
| 2007/0280483 | A1 | 12/2007 | Fu et al. |
| 2008/0165959 | A1 * | 7/2008 | Hong ............... G11B 20/00086 380/200 |
| 2009/0327746 | A1 | 12/2009 | Greco et al. |
| 2016/0357687 | A1 | 12/2016 | Greco et al. |

OTHER PUBLICATIONS

"Advanced Encryption Standard (AES)", Federal Information Processing Standards Publication 197, Nov. 2001, pp. 1-51.
D.A. McGrew, et al., "The Galois/Counter Mode of Operation (GCM)", May 2005, pp. 1-44.
U.S. Appl. No. 11/733,669, filed Apr. 10, 2007.
Office Action dated Jul. 9, 2010, pp. 35, for U.S. Appl. No. 11/733,669, filed Apr. 10, 2007.
Response dated Oct. 11, 2010, pp. 19, to Office Action dated Jul. 9, 2010, pp. 35, for U.S. Appl. No. 11/733,669, filed Apr. 10, 2007.
Final Office Action dated Dec. 17, 2010, pp. 59, for U.S. Appl. No. 11/733,669, filed Apr. 10, 2007.
Response dated Mar. 17, 2011, pp. 21, to Office Action dated Jul. 9, 2010, pp. 35, for U.S. Appl. No. 11/733,669, filed Apr. 10, 2007.
Advisory Action dated Apr. 7, 2011, pp. 7, for U.S. Appl. No. 11/733,669, filed Apr. 10, 2007.
Notice of Appeal dated Apr. 13, 2011, pp. 1, for U.S. Appl. No. 11/733,669, filed Apr. 10, 2007.
Pre-Appeal Brief Request for Review dated Apr. 13, 2011, pp. 6, for U.S. Appl. No. 11/733,669, filed Apr. 10, 2007.
Notice of Panel Decision dated Jun. 10, 2011, pp. 2, for U.S. Appl. No. 11/733,669, filed Apr. 10, 2007.
Office Action dated Jul. 1, 2011, pp. 24, for U.S. Appl. No. 11/733,669, filed Apr. 10, 2007.
Response dated Oct. 3, 2011, pp. 22, to Office Action dated Jul. 1, 2011, pp. 24, for U.S. Appl. No. 11/733,669, filed Apr. 10, 2007.
Final Office Action dated Dec. 8, 2011, pp. 28, for U.S. Appl. No. 11/733,669, filed Apr. 10, 2007.
Response dated Mar. 8, 2012, pp. 18, to Final Office Action dated Dec. 8, 2011, pp. 28, for U.S. Appl. No. 11/733,669, filed Apr. 10, 2007.
Requirement for Restriction/Election dated Aug. 4, 2014, pp. 6, for U.S. Appl. No. 11/733,669, filed Apr. 10, 2007.
Response dated Oct. 3, 2014, pp. 8, to Requirement for Restriction/Election dated Aug. 4, 2014, pp. 6, for U.S. Appl. No. 11/733,669, filed Apr. 10, 2007.
Notice of Allowance dated Dec. 10, 2014, pp. 11, for U.S. Appl. No. 11/733,669, filed Apr. 10, 2007.
Corrected Notice of Allowability dated Jan. 21, 2015, pp. 2, for U.S. Appl. No. 11/733,669, filed Apr. 10, 2007.
U.S. Appl. No. 14/627,763, filed Feb. 20, 2015, pp. 20.
Preliminary Amendment dated Feb. 20, 2015, pp. 6, for U.S. Appl. No. 14/627,763, filed Feb. 20, 2015.
Office Action dated Oct. 20, 2016, pp. 23, for U.S. Appl. No. 14/627,763, filed Feb. 20, 2015.
Amendment filed Jan. 10, 2017, pp. 13, to Office Action dated Oct. 20, 2016, pp. 23, for U.S. Appl. No. 14/627,763, filed Feb. 20, 2015.
Final Office Action dated Feb. 16, 2017, pp. 24 for U.S. Appl. No. 14/627,763, filed Feb. 20, 2015.
Response dated Apr. 13, 2017, pp. 6, to Final Office Action dated Feb. 16, 2017, pp. 24 for U.S. Appl. No. 14/627,763, filed Feb. 20, 2015.
Notice of Allowance dated Apr. 27, 2017, pp. 8, for U.S. Appl. No. 14/627,763, filed Feb. 20, 2015.

* cited by examiner

KEY ENCRYPTION AND DECRYPTION

BACKGROUND

1. Field

Embodiments of the invention relate to key encryption and decryption.

2. Description of the Related Art

Data storage drives (e.g. tape drives) are known for providing cost effective storage and retrieval of large quantities of data. The data in data storage drives is stored on data storage media that are, in turn, stored in storage bins having storage shelves or the like inside the data storage drive in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in data storage drives is resident on data storage media that is contained within a cartridge and referred to as a data storage media cartridge. An example of a data storage media cartridge that is widely employed in data storage drives for mass data storage is a magnetic tape cartridge.

In some conventional systems, a host computer sends encrypted data to a data storage drive. The encrypted data is stored on the data storage media. However, for situations in which data is received unencrypted at the data storage drive, there is a need in the art for encrypting the data prior to storage on the data storage media.

SUMMARY OF EMBODIMENTS OF THE INVENTION

Provided is a data storage drive for encrypting data, comprising a microprocessor and circuitry coupled to the microprocessor and adapted to receive a session encrypted data key and to decrypt the session encrypted data key using a session key, wherein a result is a data key that is capable of being used to encrypt clear text and to decrypt cipher text written to a storage medium.

Also provided is a system, comprising a microprocessor and circuitry coupled to the microprocessor and adapted to receive a session encrypted data key and to decrypt the session encrypted data key using a private key, wherein a result is a secret key that is capable of being used to encrypt clear text and to decrypt cipher text written to a storage medium.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Certain embodiments provide a symmetric encryption circuit that receives a session encrypted data key (SEDK) and a session key. The session key is used to unwrap the session encrypted data key to produce a data key, wherein the data key is capable of being used to encrypt clear text input to a data storage drive for storage on a data storage medium and to decrypt cipher text read from a data storage medium and that is to be output to a host. The symmetric encryption circuit enables unwrapping the session encrypted data key internal to an Application Specific Integrated Circuit (ASIC) such that the result of the decryption (i.e. unwrapping), which is a data key, is not accessible external to the ASIC.

In certain embodiments, it is assumed that any eavesdropper could know the SEDK and that the key required to decrypt the SEDK, the session key, was either passed to the data storage drive over some secure link (e.g. with IP security (IPsec), Secure Sockets Layer (SSL), or Transport Layer Security (TLS)) or somehow known to the ASIC and the sender before any eavesdropper could listen.

When the SEDK is wrapped with symmetric encryption, a symmetric decryption is required, and embodiments provide hardware in which multiplexors (MUXes) are controlled so that the value unwrapped from the SEDK, the data key that is used to encrypt or decrypt user data, is not accessible to an entity outside the ASIC (e.g. by the microprocessor). In this case, the controls for the multiplexors are intertwined such that if one multiplexor selects a certain input, another multiplexor selects a certain input.

Certain embodiments provide an asymmetric encryption circuit. When the SEDK is wrapped with asymmetric encryption, an asymmetric decryption is required, typically using the private key of a public-private key pair set. In this case the private key may only be accessible by hardware internal to the ASIC, and the requirements to intertwine the controls for the multiplexors is much reduced—one only need assure that the private key, and the result of the decryption with the private key, is not accessible external to the ASIC.

Figure 1:
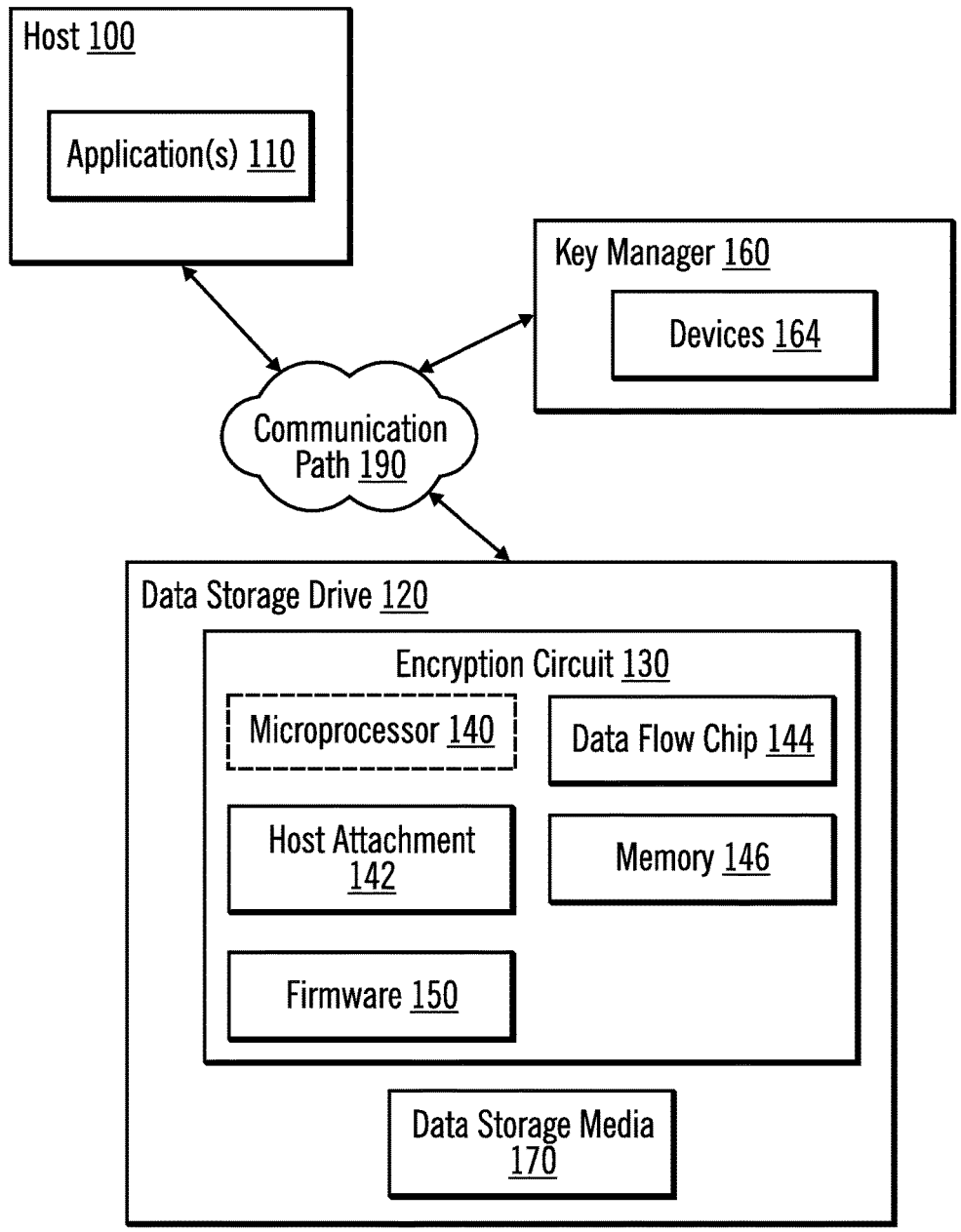
FIG. 1 illustrates details of a computing architecture in accordance with certain embodiments.

FIG. 1 illustrates details of a computing architecture in accordance with certain embodiments. A host 100 is connected via a communication path 190 to a data storage drive 120. The host 100 includes one or more applications 110. In certain embodiments, the data storage drive 120 may reside in a data storage library, while, in other embodiments, the data storage drive 120 does not reside in a data storage library.

The data storage drive 120 includes an encryption circuit 130 and data storage media 170. The encryption circuit 130 includes a microprocessor 140, a host attachment 142 (e.g. a Fibre Channel (FC) chip, Serial Attached SCSI (SAS), parallel SCSI, Enterprise Systems Connection (ESCON), Fiber Connectivity (FICON), etc.)), a data flow chip 144, memory 146, and firmware 150. In certain embodiments, the encryption circuit 130 is a symmetric encryption circuit, and in certain alternative embodiments, the encryption circuit 130 is an asymmetric encryption circuit. A chip may be described as providing logic circuitry that implements some functionality. The data flow chip 144 enables data from the microprocessor 140 or host attachment 142 to be encrypted and stored in the data storage media 170. The data flow chip 144 also enables the encrypted data from the data storage drive 120 to be decrypted. In certain embodiments, the data flow chip 144 is an ASIC. In certain embodiments, the microprocessor 140 is part of the circuitry of the data flow chip 144.

The data storage drive 120 is also connected to a key manager 160, which includes devices 164. The key manager 160 generates keys that may be used to encrypt data using the data flow circuitry 144.

The host 100, data storage drive 120, and key manager 160 may each comprise any code running on a computing device known in the art, such as a server, mainframe, workstation, personal computer, hand held computer, laptop telephony device, network appliance, etc.

The communication path 190 may comprise, for example, any type of network, such as a Storage Area Network (SAN), a peer-to-peer network, a spoke and hub network, a Local Area Network (LAN), a Wide Area Network (WAN), the Internet, an Intranet, etc.

Figure 2:
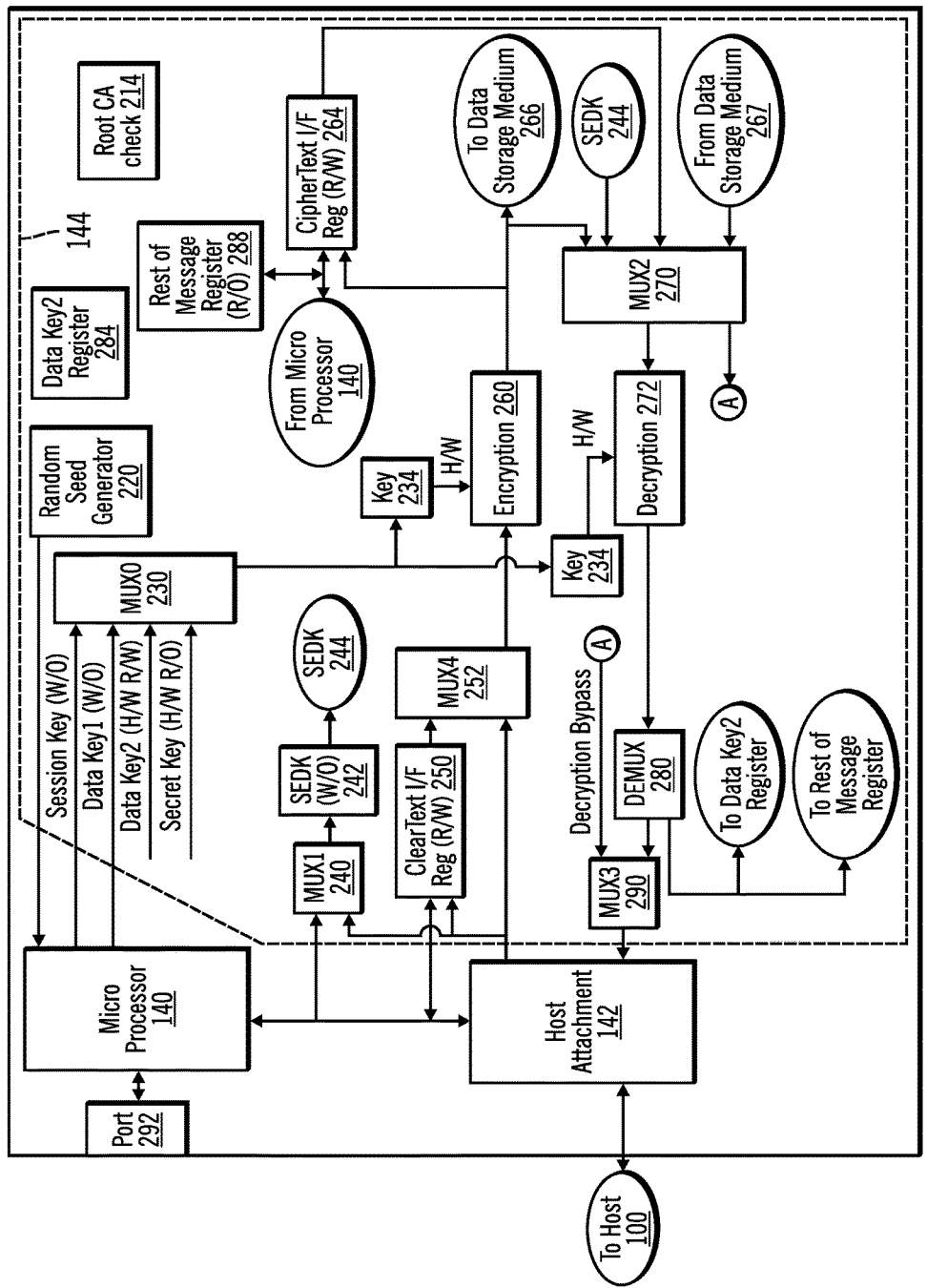
FIG. 2 illustrates a hardware block diagram of a symmetric encryption circuit that enables encryption and decryption of data in accordance with certain embodiments.

FIG. 2 illustrates a hardware block diagram of a symmetric encryption circuit that enables encryption and decryption of data in accordance with certain embodiments. In the hardware block diagram, a microprocessor 140, a host attachment 142, and a data flow chip 144 are coupled to each other.

The data flow chip 144 may include a random seed generator 220 that generates random numbers. The data flow chip 144 may also include a circuit which can check the root Certificate of Authority (CA), check block 214, that checks that a signature (on a message or certificate) can be traced back to a root certificate of authority signature.

The data flow chip 144 may include several multiplexors (MUXes), depending on the level of flexibility required. A multiplexor may be described as device that combines ("multiplexes") signals for transmission over a single medium. Certain embodiments may implement Advanced Encryption Standard (AES) encryption, which is a subset of symmetric secret-key cryptography, for encrypting user data which is written to a storage medium. The same algorithm, AES, may also be used to wrap data keys into SEDKs, for exchange of key material between the key manager 160 and the data storage drive 120. Alternatively asymmetric encryption, such as RSA or ECC, may be used to wrap symmetric AES data keys to create SEDKs. The AES was adopted by the National Institute of Standards and Technology (NIST) as US Federal Information Processing Standard (FIPS) PUB 197 on Nov. 26, 2001. Certain embodiments implement AES, which may be used to encrypt user data, include Galois/Counter Mode (GCM) Message Authentication Code (MAC) by encrypting data with a GCM key. GCM is further described in "The Galois/Counter Mode of Operation (GCM)" by David A. McGrew and John Viega, May 31, 2005.

The data flow chip 144 includes MUX0 230 (i.e. a first multiplexor), which, in certain embodiments, selects one of four keys to be used as a GCM key. In certain embodiments, MUX0 230 selects one of the following four keys: a session key, a Data Key1 (sometimes referred to as "Backup" Data Key1), a Data Key2 (sometimes referred to as "Standard" Data Key2), or a Secret Key. The session key is write only and is stored in a Write Only (W/O) register by the microprocessor 140. The session key is negotiated between the data storage drive 120 and the key manager 160. Data Key1 is write only and is a backup data key that may be written by the microprocessor 140. Data Key2 is hardware read and write (H/W R/W) and is a data key decrypted from the Session Encrypted Data Key (SEDK). An SEDK may be described as Data Key2 encrypted with the session key. Data Key2 is written into a Data Key2 register 284, and the Data Key2 register 284 may only be read by MUX0 230. Therefore, the Data Key2 register value is both readable and writable (R/W), but only by hardware (H/W), thus the Data Key2 register 284 is H/W R/W. The Secret Key is read-only to the symmetric encryption circuits shown in FIG. 2. In certain embodiments, the Secret Key may be a fixed value, or a settable non-volatile value (e.g. Programmable Read Only Memory (PROM)), that exists in an Application Specific Integrated Circuit (ASIC) which is only readable internal to the ASIC in the data storage drive 120 and that is set at the time of manufacture of the data storage drive 120. In certain alternative embodiments, the Secret Key may be the output of some other circuit that may have actively negotiated a Secret Key (e.g. a shared secret may have been negotiated via a Diffie-Hellman (D-H) key exchange), and the secret key may be that shared secret or derived from that shared secret. In yet other embodiments, the Secret Key may have been transmitted to the drive wrapped in a public key (e.g. with RSA or ECC key encryption techniques), where the ASIC has the associated private key and unwraps the Secret Key into a register, which is only readable by the symmetric encryption circuit shown in FIG. 2. The Secret Key may then be provided, for example, to the host 100. The Secret Key may be used to encrypt or decrypt data as needed. Although MUX0 is illustrated with four inputs, in certain embodiments, MUX0 may receive as few as two inputs.

In certain embodiments, the data flow chip 144 includes MUX1 240 (i.e. a second multiplexor). MUX1 240 selects the source of the Session Encrypted Data Key (SEDK). The source may be the host attachment 142 or the microprocessor 140 (e.g. if received from a RS-422 serial interface) to a wired or wireless Ethernet network). In certain alternative embodiments, the data flow chip 144 may have the source of the SEDK hard selected (i.e. MUX1 240 is not used).

MUX2 270 (i.e. a third multiplexor) selects which signal is to be input to the decryption block. The signal may either be the output of the encryption block 260 (i.e. an "encryption block") to perform a decryption on-the-fly check as part of a standard write; the SEDK 244 output from the SEDK register 242; when decryption of the data key is being performed, the output of the CipherText interface (I/F) register 264; or data that is being read from the data storage medium 267 as part of a standard Read. In certain alternative embodiments in which "decryption-on-the-fly" is not available, the data flow chip 144 may not implement MUX2 270. In certain embodiments, the output of MUX2 270 may bypass decryption and be input to MUX3 290.

DEMUX 280 is a demultiplexor that selects which direction the decryption block 272 output is sent. The decryption block 272 output may be sent either to MUX3 290 bound for the host attachment 142 or to the Data Key2 register 284 and the rest of message register 288. For example, Data Key2 may be the first 32 bytes of an encrypted message and this portion is sent to the Data Key2 register 284, while the remaining portion of the encrypted message after the first 32 bytes is sent to the rest of message register 288. As an alternative example, the Data Key2 may be the second 32 bytes of the encrypted message and is sent to the Data Key2 register 284, and the remaining portion of the encrypted message is sent to the rest of message register 288.

MUX3 (i.e. a fourth multiplexor) 290 selects either the output of DEMUX 280 or a decryption bypass as a source of data to output to the host attachment 142. In certain embodiments that do not allow for transfer of cipher text, the data flow chip 144 may not implement MUX3 290.

MUX4 252 (i.e. a fifth multiplexor) selects whether data to be encrypted is coming from the host attachment 142 or from the microprocessor 140 via a ClearText interface (I/F) register 250. In certain embodiments that do not allow for clear text to be passed in by the microprocessor, the data flow chip 144 may not implement MUX4 252.

A ClearText I/F register 250 stores clear text (i.e. data that has not been encrypted). An encryption block 260 performs encryption, for example, in a GCM mode. A decryption block 272 (i.e. a "decryption block") performs decryption, for example, in GCM mode. A CipherText I/F register 264 stores encrypted data.

The microprocessor 140 is able to read the Data Key2 register 284, the cipher text I/F register 264, and the rest of message register 288. The microprocessor 140 is also able to write to the ClearText I/F register 250.

Initially, the data storage drive 120 builds a key exchange message in memory 146 and calculates a digital signature with firmware 150. One or more initial messages sent may not be encrypted. These initial messages may be sent by the microprocessor 140 directly to a port 292 (e.g. a RS-422 port) (out-of-band) or to the decryption bypass line (in-band). In-band refers to the initial messages traveling on a same host attachment 142 that data travels on to the drive (e.g. Fibre Channel), while out-of-band refers to the initial messages not traveling on the same host attachment as the data travels on (e.g. IP link bridged to RS-422). These initial messages are used to negotiate a session key with the key manager 160. Once a session key is negotiated, the data contents of each message is encrypted with the session key.

In certain embodiments, the microprocessor 140 of data storage drive 120 writes the session key as input to MUX0 230. The session key is output from MUX0 230 as key 234 and sent as input to the encryption block 260. ClearText is then provided to the encryption block 260 in one of two ways, either the data is received from the host attachment 142, or the microprocessor 140 fills the ClearText I/F register 250 (or sends a series of writes to a given register). MUX4 252 selects which of these two provides input to the encryption block 260, and this multiplexor is typically controlled by register bits set by the microprocessor. The microprocessor 140 then causes encryption of the clear text to occur with the key 234 in encryption block 260. The encrypted data output is collected in the CipherText I/F register 264. This encrypted data is then passed by the microprocessor 140 out to the port 292 or to the decryption bypass line.

After the session key is established, the key manager 160 sends the data storage drive 120 a Session Encrypted Data Key (SEDK). The data storage drive 120 receives the SEDK and MUX1 240 selects the source of the SEDK. The output of MUX1 240 is the SEDK, which is stored into the SEDK register 242. The SEDK 244 in the SEDK register 242 is also an input to MUX2 270. Control logic in the data storage drive 120 sets the select lines such that MUX0 230 selects the Session Key. This causes MUX2 270 to select the input line with SEDK 244 (i.e. the SEDK 244 stored in SEDK register 242). MUX2 270 outputs the SEDK to the decryption block 272, which decrypts the SEDK with the session key. The decryption block 272 outputs the decrypted data as input to DEMUX 280. DEMUX 280 outputs the decrypted data into registers 284 and 288. In particular, the output of DEMUX 280 is a Data Key2 portion 282 that is sent to Data Key2 register 284 and a rest of message portion 286 that is sent to rest of message register 288.

Once Data Key2 is stored in the Data Key2 register, the microprocessor 140 may set the select lines such that the Data Key2 is selected by MUX0 230. Data Key2 is output from MUX0 230 as key 234 and sent as input to the encryption block 260. Either the microprocessor 140 fills the ClearText I/F register or the host attachment 142 fills the ClearText I/F register 250. Clear text output from the ClearText I/F register 250 is input to MUX4 252. The microprocessor 140 sets control bits which are processed by ASIC control logic to control the select lines of MUX4 252 selects the clear text and outputs the clear text to encryption block 260. The microprocessor 140 then causes encryption of the clear text to occur with Data Key2 in encryption block 260. The encrypted data (cipher text 262) is collected in the CipherText I/F register 264 and is sent to data storage medium 266 (e.g. in data storage media 170).

The microprocessor 140 may set the select lines such that Data Key1 is selected by MUX0 230. Data Key1 is output from MUX0 230 as key 234 and sent as input to the encryption block 260. Either the microprocessor 140 fills the ClearText I/F register or the host attachment 142 fills the ClearText I/F register 250. Clear text output from the ClearText I/F register 250 is input to MUX4 252. The microprocessor 140 sets control bits which are processed by ASIC control logic to control the select lines of MUX4 252 so that it selects the clear text and outputs the clear text to encryption block 260. The microprocessor 140 then causes encryption of the clear text to occur with Data Key1 in encryption block 260. The encrypted data (cipher text 262) is collected in the CipherText I/F register 264 and is sent to data storage medium 266 in data storage media 170. If the Data Key was passed to the data storage drive 120 in the clear (i.e. without being encrypted), or if the SEDK was unwrapped by code running on the microprocessor 140, then the microprocessor 140 would typically program the Data Key into the ASIC, which would be Data Key 1. On the other hand, if the SEDK was unwrapped in decryption hardware (e.g. by decryption block 272), then it can travel though demux 280 and be latched as Data Key2.

The microprocessor 140 may set the select lines such that the Secret Key is selected by MUX0 230. Secret Key is output from MUX0 230 as key 234 and sent as input to the encryption block 260. Either the microprocessor 140 fills the ClearText I/F register or the host attachment 142 fills the ClearText I/F register 250. Clear text output from the ClearText I/F register 250 is input to MUX4 252. The microprocessor 140 sets control bits which are processed by ASIC control logic to control the select lines of MUX4 252 so that it selects the clear text and outputs the clear text to encryption block 260. The microprocessor 140 then causes encryption of the clear text to occur with Secret Key in encryption block 260. The encrypted data (cipher text 262) is collected in the CipherText I/F register 264 and is sent to data storage medium 266 in data storage media 170. The Secret Key may be used when data is to be encrypted with a previously shared secret (e.g. set at time of manufacture, or based on public key decryption of an SEDK in hardware).

Figure 3:
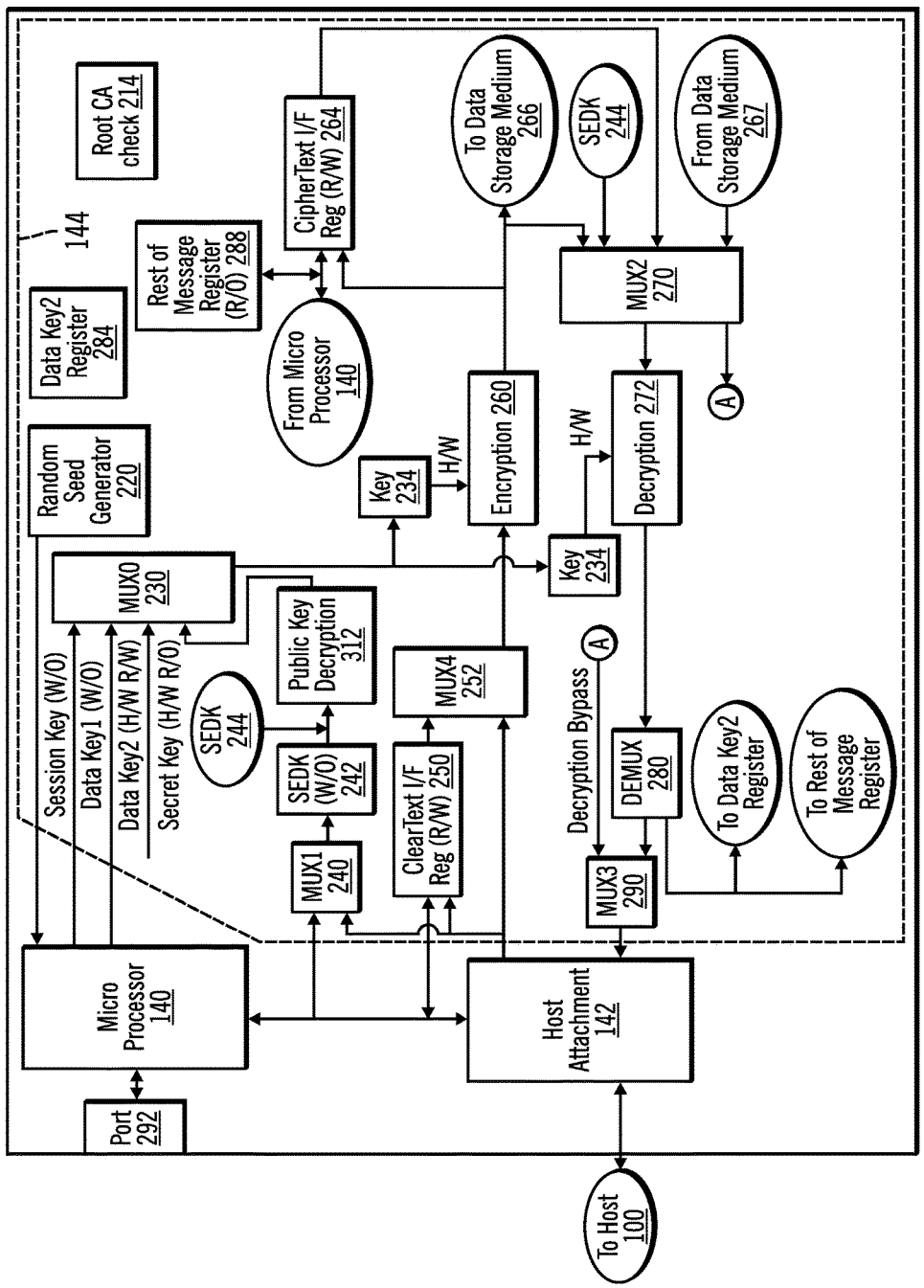
FIG. 3 illustrates a hardware block diagram of an asymmetric encryption circuit that enables encryption and decryption of data in accordance with certain embodiments.

FIG. 3 illustrates a hardware block diagram of an asymmetric encryption circuit that enables encryption and decryption of data in accordance with certain embodiments. In the hardware block diagram, a microprocessor 140, a host attachment 142, and a data flow chip 144 are coupled to each other. A public decryption key block 312 enables public key unwrapping. A public-private key set is established at some point (e.g. at time of manufacture of the data storage drive 120 or at a later time by a controlled process that has physical access to the data storage drive 120 and knowledge of some special procedure). In an alternative embodiment, the private key is hard coded into the ASIC's circuitry using VHDL (Very-High-Speed Integrated Circuit (VHSIC) Hardware Description Language) or Verilog, which would result in all ASICs made with this VHDL or Verilog having the same key), and the private key of this public-private key pair is stored involatilely in the ASIC (e.g. PROM) in a register that may only be read internal to the ASIC (e.g. the microprocessor 140 cannot read the private key because the microprocessor 140 is external to the ASIC). The public key may either be programmed into registers that can be read external to the ASIC or stored separately from the ASIC, potentially in publicly accessible memory space. This public key may be stored in a certificate signed by a root Certificate of Authority (CA).

The external key manager 160 obtains the data storage drive's 120 public key and uses the public key to wrap a Data Key to create the SEDK, which is sent to the data storage drive 120 and input to the data flow chip 144 (i.e. ASIC) either directly from the host attachment 142 or by the microprocessor 140 (where MUX 240 selects which). The SEDK is then provided to the public key decryption block 312, which decrypts the SEDK with the private key to create the Secret Key, which will be used as the Data Key.

Use of the secret key in this manner eliminates the key distribution problem associated with the session key. Additionally, use of the secret key in this manner closes many attack vectors. For example, a hacker is not able to break the SEDK without somehow ascertaining the private key stored inside the ASIC in a register space that is not accessible by external entities. Moreover, use of the secret key in this manner does not rely on interlocked control of the multiplexors to avoid escape of the data key.

Examples of public key cryptography techniques that may be used with embodiments include RSA or ECC encryption techniques. In certain embodiments, the Diffie-Hellman key exchange, which requires active negotiation, may be used.

The root CA check block 214 that provides circuitry to check the root CA's signature requires public key capability. In certain embodiments, the public key decryption block 312 provides one set of public key circuitry that may be used to either check a root CA's signature or to unwrap SEDKs. That is, in certain embodiments, one set of public key circuitry may be used in different ways depending on the task being accomplished. In certain alternative embodiments, two separate circuits may be used to check a root CA's signature and to unwrap SEDKs (i.e. blocks 312, 214).

Moreover, to check a root CA's signature, the CA's public key is stored in the ASIC. For example, the public key may either be stored in a PROM at time of manufacture or may be hard coded in VHDL (or Verilog). With the latter, in the case that a CA's private or "signing" key is compromised, the CA would have to use a new public-private key pair. Certain embodiments may allow the public key stored in the ASIC to be updated (e.g. if one had physical access to the drive and knew some special procedure).

In certain embodiments, the microprocessor 140 may be embedded in the ASIC. In this configuration, the microprocessor 140 may perform certain of the cryptographic operations, and in particular public key cryptography, such as unwrapping an SEDK or checking the chain of trust of a certificate (e.g. that it can be checked back to a CA's signature). Such a microprocessor 140, or the circuitry around it, would have to allow operation in a mode such that the microprocessor registers cannot be seen when doing certain cryptographic operations (e.g. unwrapping the SEDK and storing the Data Key into a Write Only register). This would prevent, for example, an emulator from being used to capture the key used to unwrap the SEDK, or the Data Key inside it. Thus circuitry prevents any emulator from knowing all the registers and operations of the microprocessor 140 (i.e. through the ASIC) while the microprocessor 140 is performing these certain cryptographic operations. Such embodiments isolate the microprocessor 140 when the microprocessor 140 is performing certain cryptographic operations.

Thus, as an example of the use of the MUXes, when the select lines into MUX0 230 are selecting the session key (i.e. the "A input"), the microprocessor 140 sets control bits which are processed by ASIC control logic to control the select lines of MUX2 270 to select the SEDK (i.e. the "B input") and causes DEMUX 280 to direct the decrypted output from decryption block 272 to the Data Key2 register 284 and the rest of message register 288. This intertwined selection of MUXes prevents the microprocessor 140 from having access to part of the result of a decryption using the session key, and so the microprocessor 140 does not have access to the data key and cannot decrypt data in data storage media 170.

Thus, host data is encrypted with a data key, either Data Key2 (which the host obtained by unwrapping a SEDK in hardware) or Data Key1 (which was programmed in by the microprocessor). The Secret Key if used, is used as a static session key, which is to say as the wrapper of a SEDK.

Thus, embodiments provide a data storage drive architecture that allows a portion of key exchange to be done by firmware and provides a hardware implementation for encryption and decryption of data so that the data and session keys are inaccessible, for example, even to someone with a debugger attached to the microprocessor in the data storage drive.

The term logic may include, by way of example, software, hardware, firmware, and/or combinations of software and hardware.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. An Application Specific Integrated Circuit (ASIC), comprising:
   a microprocessor;
   a host attachment; and
   circuitry coupled directly to the microprocessor and directly to the host attachment, the circuitry comprising:
   a root Certificate of Authority check block that checks a root Certificate of Authority (CA) signature;
   a first multiplexor that selects a encrypted data key from inputs of a first encrypted data key from the microprocessor and a second encrypted data key from the host attachment, wherein the encrypted data key is created by using a public key of a public-private key pair to wrap a data key;
   a register coupled to the first multiplexor that stores the encrypted data key;

a public key decryption block coupled to the register and to a second multiplexor, wherein the public key decryption block receives the encrypted data key and unwraps the encrypted data key using a private key of the public-private key pair to produce the data key for use in encrypting and decrypting data;

a second multiplexor coupled to the public key decryption block that receives the data key as input from the public key decryption block, wherein the second multiplexor selects the data key received from the public key decryption block from inputs of a first session key, a backup data key, a standard data key, and the data key received from the public key decryption block;

an encryption block coupled to the second multiplexor that receives clear text and the data key, wherein the clear text is selected from first clear text from the microprocessor and second clear text from the host attachment, and wherein the encryption block encrypts the clear text with the data key to generate encrypted text; and a decryption block coupled to the second multiplexor that receives a piece of encrypted data selected from the encrypted data key and the encrypted text from the encryption block, wherein the decryption block decrypts the piece of encrypted data.

2. The ASIC of claim 1, wherein registers used by the microprocessor cannot be seen by an emulator when the microprocessor performs the checking and the unwrapping.

3. The ASIC of claim 1, further comprising:
the circuitry storing the private key.

4. The ASIC of claim 3, wherein the private key is stored in a register space inside the ASIC that is not accessible by external entities.

5. The ASIC of claim 1, wherein the circuitry further comprises:
a third multiplexor that selects the clear text from inputs of the first clear text from the microprocessor and the second clear text from the host attachment; and
a fourth multiplexor that selects the piece of encrypted data from inputs of the session encrypted data key and the encrypted text from the encryption block.

6. A system, comprising:
a microprocessor;
a host attachment coupled to the microprocessor; and
circuitry coupled to the microprocessor and to the host attachment, the circuitry comprising an Application Specific Integrated Circuit (ASIC) for encryption and decryption that includes a first multiplexor, a second multiplexor, a public key decryption block, a decryption block, an encryption block, and a demultiplexor;

wherein the first multiplexor selects an encrypted data key from inputs of a first encrypted data key from the microprocessor and a second encrypted data key from the host attachment, and wherein the encrypted data key is input to the public key decryption block;

wherein the public key decryption block is coupled to the first multiplexor and to the second multiplexor and decrypts the encrypted data key using a private key to obtain a secret key, and wherein the secret key is input to the second multiplexor;

wherein the second multiplexor is coupled to the decryption block and to the encryption block and selects the secret key, from inputs of a first key, a backup data key, a standard data key, and the secret key, wherein the secret key is input to the decryption block and to the encryption block;

wherein the encryption block encrypts clear text using the secret key to generate encrypted text;

wherein the decryption block decrypts the encrypted text using the secret key;

wherein a demultiplexor is coupled to the decryption block, receives the decrypted text, and selects one of storage of the decrypted text and forwarding of the decrypted text to the host attachment; and wherein the circuitry controls the first multiplexor and the second multiplexor so that the secret key, after the decryption, is not accessible to an entity outside the ASIC.

7. The system of claim 6, further comprising:
a key appliance;
a data storage drive coupled to the key appliance, wherein the circuitry is implemented at the data storage drive; and
the key appliance obtaining a public key that is part of a public-private key pair from the data storage drive, using the public key to wrap the secret key to create the encrypted data key, and sending the encrypted data key to the data storage drive.

8. The system of claim 6, wherein the private key is part of a public-private key pair.

9. The system of claim 6, wherein the private key is stored in a register space inside the ASIC that is not accessible by external entities.

* * * * *